Jan. 21, 1941. R. D. AMSDEN 2,229,432
CONTROL SYSTEM
Filed Sept. 9, 1938

Inventor:
Ralph D. Amsden,
by Harry E Dunham
His Attorney.

Patented Jan. 21, 1941

2,229,432

UNITED STATES PATENT OFFICE 2,229,432

CONTROL SYSTEM

Ralph D. Amsden, Lynn, Mass., assignor to General Electric Company, a corporation of New York Application September 9, 1938, Serial No. 229,129

12 Claims. (Cl. 171—314)

This invention relates to electrical control systems and more particularly to a new and improved automatic voltage control system which is adapted for use with battery chargers.

Many storage batteries are connected to supply energy to load circuits and to receive energy from a charging circuit. A well-known way of controlling the state of charge of the battery in such a system is by means responsive to the battery voltage for initiating the charging, or increasing the charging rate, of the battery when the battery voltage falls below a predetermined minimum value and for discontinuing the charging, or reducing the charging rate, when the battery voltage rises above a predetermined maximum value.

For best operation of such systems it is desirable that the battery voltage be maintained within closer limits than can be maintained with an ordinary voltage relay.

In accordance with an important feature of this invention an ordinary voltage relay having relatively widely different pull-in and drop-out values is automatically recalibrated or reset in such a manner as to operate within very close voltage limits by means of a simple and inexpensive secondary relay.

By pull-in and drop-out values of a relay are meant the respective values of energization of its operating winding which correspond to the movement of its armature into its minimum and maximum reluctance positions with respect to its core or operating winding regardless of whether such motion causes the opening of contacts or the closing of contacts.

An object of the invention is to provide a new and improved electrical control system.

Another object of the invention is to provide a new and improved voltage control system for battery chargers.

A further object of the invention is to provide a new and improved automatic battery charger.

The invention will be better understood from the following description taken in connection with the accompanying drawing and its scope will be pointed out in the appended claims.

Figure 1:
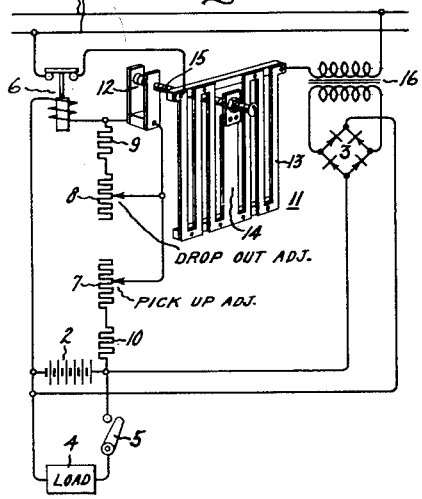
Figure 2:
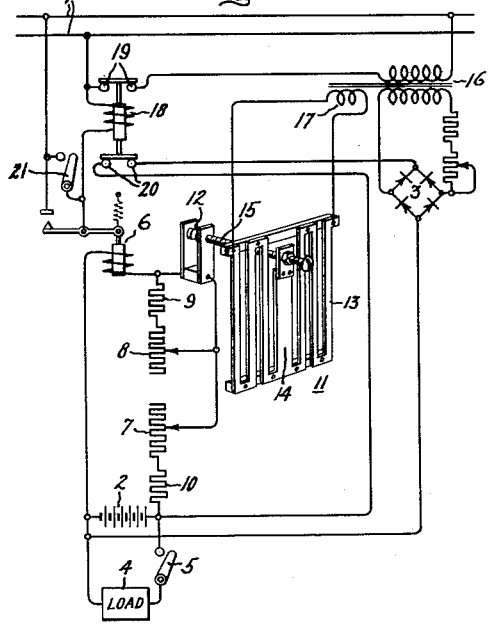
Figure 3:
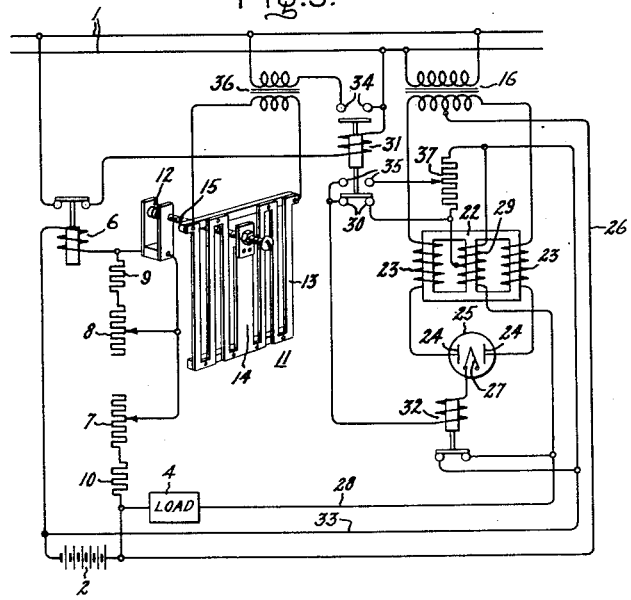
Figure 4:
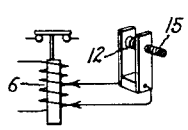

In the drawing Fig. 1 is a diagrammatic illustration of an embodiment of the invention and Figs. 2, 3 and 4 represent modifications thereof.

Referring now to the drawing and more particularly to Fig. 1, there is shown therein an alternating current supply circuit 1 for supplying charging current to a storage battery 2 through a rectifier 3. A load 4 is adapted to be connected to be energized by the battery by means of a switch 5.

The charging of the battery 2 is controlled by a primary voltage responsive relay 6 connected across the battery through a pair of serially-connected rheostats 7 and 8. The winding of the relay 6 is usually made of copper which has an appreciable temperature coefficient of resistance and if it is desired to compensate the coil circuit of this device for variations in temperature, additional fixed resistors 9 and 10 having suitable temperature coefficients of resistance for producing this compensation may also be connected in circuit with the winding 6.

The rheostat 7 controls the value of voltage at which the relay 6 picks up and the rheostat 8, in combination with a secondary relay 11, controls the drop-out value of the relay 6.

The secondary relay 11 comprises a set of normally open contacts 12 connected in shunt circuit relation with the rheostat 8. These contacts are arranged to be closed by an electrically-heatable thermally-actuated device 13. This device is disclosed and claimed in Westendorp Patent 2,095,846, which is assigned to the assignee of the present invention, and, consequently, the details thereof form no part of the present invention. Briefly described, the device consists of a grid of bimetallic thermally-deformable material supported at the top end thereof. A heating current is arranged to be circulated through all of the grid except a central member 14 which carries an adjustably positioned screw 15 for closing the contacts 12.

An insulating transformer 16 is interposed between the supply circuit and the rectifier, although an autotransformer could be used.

The voltage relay 6 may be provided with either normally closed or normally open contacts. In the illustrated circuit the relay is provided with normally closed contacts, that is to say, contacts which are closed when the relay is deenergized, because such an arrangement is the simplest for the circuit shown in Fig. 1. The primary of the transformer 16 and the thermal device 13 are connected in series across the supply circuit through the normally closed contacts of the relay 6.

The operation of Fig. 1 is as follows. The parts are illustrated in the positions they assume immediately after the voltage relay drops out in response to a low voltage condition of the battery 2. This may be caused in any well-known manner, such as by it having become discharged by means of the load 4. The current flowing through the primary winding of the transformer 16 causes energization of the rectifier and charging of the storage battery. The transformer primary current in flowing through the bimetallic grid 13 heats it and this causes it to flex or move screw 15 in a direction toward the contacts 12. As current does not flow through the central member 14 this member is not heated by the current and, consequently, it is not deformed. The screw 15 closes the contacts 12, thereby short circuiting the rheostat 8. This short circuiting of the rheostat 8 immediately increases the energization of the relay 6. This increase in energization may be made enough to cause the relay 6 immediately to pick up but as a rule this action is undesirable as it will result in a hunting or pumping action of the circuit because as soon as relay 6 picks up thermal device 11 will be deenergized, the contacts 12 will separate thereby reinserting the rheostat 8 in series with the relay 6 and causing it to drop out again. The rheostat 8 is preferably adjusted to such a value that when it is short circuited by the closure of the contacts 12 the voltage relay circuit will be so set or calibrated that the relay 6 will pick up at a battery voltage which is slightly higher than the voltage at which it dropped out. For example, if the drop out voltage is 2.2 volts per cell the pick up value will be typically 2.4 volts per cell. Another suitable setting is a 2.1 volt per cell drop out value and a 2.33 volt per cell pick up value. It is easily possible with the circuit to obtain even closer voltage limits than these.

It normally requires but a few seconds after the relay 6 drops out for the secondary thermal relay 11 to close the contacts 12.

As soon as the battery voltage rises slightly, the pick-up voltage of the relay 6 will be reached whereupon this relay will pick up and open its contacts thereby interrupting the charging circuit and deenergizing the heating element 13 which in a few seconds will cool and open the contacts 12 thereby reinserting the rheostat 8 in circuit with the voltage relay. This reduces the energization of the relay to such a point that it will drop out when the battery voltage falls slightly below the pick-up value.

The adjustment or setting of the pick-up voltage is usually made by the rheostat 7 at a time when the relay 6 is dropped out and the contacts 12 have short circuited the rheostat 8 and this adjustment is usually made first. The drop out adjustment or setting is made by the rheostat 8 after the pick-up value has been set by adjusting the rheostat 7.

The thermal resetting relay 11 is independent of changes in ambient temperature because changes in ambient temperature cause similar changes in the temperature of the central strip 14 and the outer grid or strip 13. The result is that changes in ambient temperature cause the bottom of the grid to move in one direction because the grid is supported at the top, while these same changes in temperature cause the top of the central projection 14 to move in the opposite direction because this projection is supported at the bottom. Screw 15 only responds to the sum of these movements so that if these individual opposite direction movements are substantially equal there will be substantially no movement of the screw 15 as a result of the changes in ambient temperature.

While the thermal device 11 has been shown connected in the primary or input side of the transformer 16 it will, of course, be obvious to those skilled in the art that it might equally well be connected in the secondary or output side of the transformer 16 if desired.

In the modification shown in Fig. 2 the thermal device 11 is energized by a tertiary winding 17 on the transformer 16. This is desirable in cases where the load circuit or the battery circuit requires relatively heavy current, as the tertiary winding may be made to supply merely the relatively small amount of current to heat the device 13.

Another difference between Fig. 2 and Fig. 1 is that the primary relay 6 is a normally open relay instead of a normally closed relay. Consequently it does not control directly the making and breaking of the charging circuit, but does so indirectly through an auxiliary relay 18 having normally closed sets of contacts 19 and 20 for respectively connecting the primary winding of the transformer 16 across the supply circuit and completing the charging circuit from the output terminals of the rectifier to the battery 2 in response to the opening of the contacts of the primary relay 6.

A manually operable switch 21 is provided for securing manual control of the charging circuit whenever desired.

The operation of Fig. 2, aside from the above noted differences, is the same as that of Fig. 1 and should be obvious in view of the foregoing.

In the modification shown in Fig. 3, my invention has been applied to a battery charger of the type shown in Fig. 9 of my Patent 2,082,607 granted June 1, 1937 and assigned to the assignee of the present invention. This is a two-rate charger in which the charging rate is increased when the battery voltage is low and is decreased when the battery voltage is high. This is done by controlling the direct current saturation of a saturable core reactor 22 having pulsating current windings 23 connected respectively between the terminals of the secondary winding of transformer 16 and the anodes 24 of a by-phase hot-cathode vacuum-tube rectifier 25. Thus, by varying the magnetic saturation of the core on which the windings 23 are placed an adjustable choking or current limiting action or voltage regulator control of the rectifier output is secured. The electrical midpoint of the secondary winding of transformer 16 is connected to a common terminal for the battery 2 and load 4 by means of a conductor 26. The remaining terminal of the load 4 is connected to the cathode 27 of the rectifier through a conductor 28, a portion of a saturating winding 29 on the reactor, a set of contacts 30 on an auxiliary relay 31 and through the operating winding on a relay 32. The remaining terminal of the battery is also connected to the cathode 27 of rectifier by means of a conductor 33, the remaining portion of the saturating winding 29, the contacts 30 and the operating winding on the relay 32.

Relay 31 is controlled by relay 6 in such a manner that when relay 6 is dropped out and closes its contacts, relay 31 is connected across the supply circuit 1. It is thereby caused to pull in and close sets of contacts 34 and 35 and open contacts 30. Contacts 34 connect an auxiliary transformer 36 across the supply circuit. This auxiliary transformer is provided for energizing the thermal device 13. Contacts 35 serve effectively to connect the cathode 27 to a different point on the saturating winding 29 by means of a potentiometer 37 in order to reduce the battery charging rate, as will be described below.

The operation of the relays 6 and 11 in combination with the rheostats 7 and 8 is similar to that which has previously been described for Figs. 1 and 2. When primary relay 6 is dropped out the closure of contacts 35 and the opening of contacts 30 on the relay 31 cause a relative increase in the ampere turns of the portion of the winding 29 which is connected in circuit with the load with respect to the ampere turns of the portion of the winding 29 which is connected in circuit with the battery. These two portions of the winding 29 carry currents in opposite directions so that their ampere-turns oppose each other and the relative ampere-turns are always such that the ampere-turns of the portion carrying the load current exceed the ampere-turns of the portion carrying the battery current. Consequently, closure of the contacts 35 and opening of the contacts 30 tend to increase the saturating effect of the differential winding 29, thus decreasing the choking effect of the windings 23 and increasing the rectifier output voltage and thereby increasing the battery charging current. As soon as the battery voltage reaches the pick-up value of the relay 6 the relay 31 will drop out, thus deenergizing the thermal relay 11 resulting in the recalibrating operation previously described and at the same time changing the connections of the differential saturating winding 29 by opening contacts 35 and closing the contacts 30. This change in connections is such as to increase the ampere-turns of the portion of the winding 29 carrying the battery charging current with respect to the ampere-turns carrying the load current, thus decreasing the saturating effect of the differential winding 29 and decreasing the charging current. By means of the adjustment on the potentiometer 37 the difference between the two rates of charge may readily be changed.

The contacts of the relay 32 are connected across the differential saturating winding 29, the purpose being to short circuit this winding whenever the rectifier is not supplying current as would be the case if there were a failure in the main supply circuit 1. Under such circumstances the load is supplied by the battery and were it not for the relay 32 all of the load current supplied by the battery would have to pass through the differential saturating winding 29 which would result in undesirable losses.

It is not essential that the secondary relay 11 short circuit a resistance in series with the coil of the primary relay 6. For example, contacts 12 of relay 11 may be connected to short circuit a part of the resistive winding on the relay 6 in order to preset the drop-out value. Such an arrangement is illustrated in Fig. 4.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In a battery charger, a battery voltage responsive relay having a dropped out condition for controlling the charging of a battery and having a picked up condition for reducing the charging rate of said battery, a resistor in circuit with said relay, and a secondary relay having a set of contacts connected across said resistor and having a thermal element adapted to close said contacts in response to the heating effect of a current caused to flow therethrough when said voltage responsive relay is dropped out.

2. In combination, an alternating current supply circuit, a storage battery, a voltage responsive relay having a set of contacts and an operating winding for opening and closing said contacts, means including a series resistor for connecting said winding across said battery, a secondary relay having a set of contacts connected across said resistor and having an electrically-heatable thermally-responsive device for opening and closing said contacts, a transformer having a primary winding connected across said supply circuit by means of said voltage relay contacts, said thermal device being in series with said primary winding, a secondary winding on said transformer, and a rectifier having input terminals connected to said secondary winding and output terminals connected to supply charging current to said battery.

3. In combination, an alternating current supply circuit, a storage battery, a voltage responsive relay having a set of normally closed contacts and an operating winding for opening said contacts, means including a pair of serially-connected rheostats for connecting said winding across said battery, a secondary relay having a set of normally open contacts connected across one of said rheostats and having an electrically-heatable thermally-responsive device for closing said normally open contacts, a transformer having a primary winding connected across said supply circuit through said normally closed voltage relay contacts and said thermal device in series, a secondary winding on said transformer, a rectifier having input terminals connected to said secondary winding and having output terminals connected to supply charging current to said battery, and a load circuit connected to be energized by said battery.

4. In combination, an alternating current supply circuit, a storage battery, a voltage responsive relay having a set of contacts and an operating winding for opening and closing said contacts, means including a series resistor for connecting said winding across said battery, a secondary relay having a set of contacts connected across said resistor and having an electrically-heatable thermally-responsive device for opening and closing said contacts, a transformer having a primary winding arranged to be connected across said supply circuit under the control of said voltage relay contacts, said thermal device being arranged to be energized by transformer action from said transformer, a secondary winding on said transformer, and a rectifier having input terminals connected to said secondary winding and having output terminals connected to supply charging current to said battery.

5. In combination, an alternating current supply circuit, a storage battery, a load circuit connected to be energized by said storage battery, a voltage responsive relay having a set of normally open contacts and an operating winding for closing said contacts, means including a pair of serially connected rheostats for connecting said winding across said battery, a secondary relay having a set of normally open contacts connected across one of said rheostats and having an electrically-heatable thermally-responsive device for closing its normally open contacts, a transformer having a primary winding arranged to be connected across said supply circuit when said voltage relay contacts are open and to be disconnected from said circuit when said normally closed voltage relay contacts are closed, a pair of secondary windings on said transformer, one of said secondary windings being connected to energize said electrically-heatable thermally-responsive device, and a rectifier having input terminals connected to be energized by the other of said secondary windings, said rectifier having output terminals connected to supply charging current to said battery.

6. In combination, an alternating current supply circuit, a storage battery, a voltage responsive relay, means including serially connected drop-out and pick-up adjusting rheostats for connecting said relay across said battery, a secondary relay having a set of normally open contacts connected across said drop-out adjusting rheostat and having an electrically-heatable thermally-responsive device for closing its normally open contacts, means including a rectifier for supplying said battery with charging current from said supply circuit, and means responsive to said voltage relay being de-actuated in response to a predetermined minimum battery voltage for energizing said electrically-heatable thermally-responsive device and for increasing the charging rate of said battery, said means being responsive to said voltage relay being actuated by a predetermined maximum battery voltage for deenergizing said electrically-heatable thermally-responsive device and reducing the charging rate of said battery.

7. In combination, an alternating current supply circuit, a storage battery, means including a rectifier for supplying said battery with charging current from said supply circuit, a voltage relay, means including a pair of serially connected rheostats for connecting said voltage relay across said battery, a pair of contacts connected in parallel with one of said rheostats, an electrically-heatable thermal device for closing said contacts, a transformer having a secondary winding for energizing said electrically-heatable thermal device, and a relay controlled by said first mentioned relay for connecting the primary winding of said transformer across said supply circuit.

8. In a system for automatically maintaining an inherently relatively widely variable electrical quantity within relatively close limits, a primary electroresponsive device connected to be responsive to said quantity and having inherently relatively widely separated pick-up and drop-out values of energization corresponding to values of said quantity which are above and below a desired value thereof, a secondary electroresponsive device arranged to be energized when said primary device is dropped out and to be deenergized when said primary device is picked up, said secondary device having means responsive to its energization for causing said primary device to pick up at a value of energization lower than its normal pick-up value but higher than its normal drop-out value, and means controlled by said primary device independently of the energization of said secondary device for raising the value of said quantity when said primary device is dropped out.

9. In a system for automatically maintaining an inherently relatively widely variable electrical quantity within relatively close limits, a primary electroresponsive device connected to be responsive to said quantity and having a picked-up condition and a dropped-out condition corresponding to values of said quantity which are above and below a desired value thereof, the difference in energizations of said device which correspond to said conditions being inherently relatively widely separated, a secondary electroresponsive device arranged to be energized when said primary device is in one of its said conditions and to be deenergized when said primary device is in the other of its said conditions, said secondary device having means responsive to its energization for modifying the energization of said primary device in such a manner as to cause its pick-up and drop-out values to be relatively close together, and means controlled by said primary device independently of the condition of said secondary device for causing changes in the value of said quantity.

10. In a system for automatically maintaining an inherently relatively widely variable electrical quantity within relatively close limits, a primary electroresponsive device connected to be responsive to said quantity and having a picked-up condition and a dropped-out condition corresponding to values of said quantity which are above and below a desired value thereof, the difference in energizations of said device which correspond to said conditions being inherently relatively widely separated, a secondary electroresponsive device arranged to be energized when said primary device is in one of its said conditions and to be deenergized when said primary device is in the other of its said conditions, said secondary device having means responsive to its energization for modifying the energization of said primary device in such a manner as to cause its pick-up and drop-out values to be relatively close together while maintaining the pick-up value of energization of said primary relay higher than its drop-out value of energization, and means controlled by said primary device independently of the energization of said secondary device for raising the value of said quantity when said primary device is in one of its said conditions.

11. In a system for automatically maintaining an inherently relatively widely variable electrical quantity within relatively close limits, a primary electroresponsive device connected to be responsive to said quantity and having inherently widely separated pick-up and drop-out values of energization corresponding to values of said quantity which are above and below a desired value thereof, a secondary electroresponsive device arranged to be energized when said primary device is dropped out and to be deenergized when said primary device is picked up, said secondary device having means responsive to its energization for causing said primary device to pick up at a value of energization lower than its normal pick-up value, and means controlled by said primary device independently of the energization of said secondary device for controlling the value of said quantity.

12. In an automatic battery charging system, a storage battery, a primary relay connected to be responsive to the voltage of said battery, said relay normally inherently picking up at a predetermined battery voltage and dropping out at a substantially different battery voltage, means responsive to the picking up and dropping out of said relay for controlling the charging of said battery, a thermal device whose heating and cooling is controlled by the picking up and dropping out of said relay, and a drop-out adjusting rheostat controlled by said thermal device for modifying the effective energization of said relay so as to make the voltages of said battery at which said relay picks up and drops out relatively close together.

RALPH D. AMSDEN.